United States Patent
Kitazawa (10) Patent No.: US 10,658,866 B2
(45) Date of Patent: May 19, 2020

(54) POWER SOURCE CONTROL CIRCUIT, PORTABLE INFORMATION PROCESSING DEVICE, AND POWER SOURCE CONTROL METHOD

(71) Applicant: SEIKO EPSON CORPORATION, Tokyo (JP)

(72) Inventor: Takeo Kitazawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/148,091

(22) Filed: Oct. 1, 2018

(65) Prior Publication Data
US 2019/0103757 A1 Apr. 4, 2019

(30) Foreign Application Priority Data
Oct. 2, 2017 (JP) .................. 2017-192354

(51) Int. Cl.
*H02J 7/00* (2006.01)
*H02J 7/35* (2006.01)

(52) U.S. Cl.
CPC ............... *H02J 7/35* (2013.01); *H02J 7/008* (2013.01); *H02J 7/00* (2013.01); *H02J 7/0029* (2013.01); *H02J 7/00302* (2020.01); *H02J 7/00306* (2020.01); *H02J 2207/40* (2020.01)

(58) Field of Classification Search
USPC ....................................... 320/101
See application file for complete search history.

(56) References Cited

U.S. PATENT DOCUMENTS

| 2007/0029883 | A1 | 2/2007 | Yoshida | |
| 2009/0115374 | A1* | 5/2009 | Noda | H01M 10/44 320/138 |
| 2015/0002073 | A1* | 1/2015 | Ju | H02J 7/022 320/103 |
| 2016/0204649 | A1* | 7/2016 | Kim | H02J 7/35 320/101 |

FOREIGN PATENT DOCUMENTS

| JP | 2007-043793 A | 2/2007 |
| JP | 2016-075581 A | 5/2016 |

* cited by examiner

*Primary Examiner* — Bryce M Aisaka
(74) *Attorney, Agent, or Firm* — Oliff PLC (57) ABSTRACT

A power source control circuit includes a USB power supply portion that supplies electric power from a power source circuit to a secondary battery, a solar power supply portion, and a monitoring circuit. A monitoring circuit causes a solar power supply portion to stop the supply of the electric power to the secondary battery if the electric power is supplied from the power source circuit. In this way, if both the power supply by the power source circuit and the power supply by power generation by the solar cell can be performed, the power source control circuit can charge the secondary battery from the power source circuit which is a stable power source, and thus, it is possible to easily secure the electric power for driving the system.

12 Claims, 8 Drawing Sheets

POWER SOURCE CONTROL CIRCUIT, PORTABLE INFORMATION PROCESSING DEVICE, AND POWER SOURCE CONTROL METHOD

CROSS-REFERENCES TO RELATED APPLICATIONS

This application claims priority to Japanese Patent Application No. 2017-192354, filed Oct. 2, 2017, the entirety of which is herein incorporated by reference.

BACKGROUND

1. Technical Field

The present invention relates to a power source control circuit, a portable information processing device, and a power source control method.

2. Related Art

Recent years, a portable information processing device including a power generation mechanism such as a solar cell (photovoltaics) has become widespread. In the portable information processing device including the power generation mechanism, a secondary battery of the portable information processing device is charged with electric power generated by the power generation mechanism so as to be used to drive the portable information processing device. For example, JP-A-2016-075581 discloses a portable information processing device that includes two power generation mechanisms for generating the electric power using two kinds of power generation methods different from each other.

Incidentally, electronic circuits in the portable information processing device in the related art includes various sensors such as an acceleration sensor and a pulse sensor, and thus, the required electric power is increasing. Therefore, in the power generation mechanism such as a solar cell in the portable information processing device in the related art, it was difficult to secure the electric power to drive the electronic circuits.

SUMMARY

An advantage of some aspects of the invention is to make it easy to secure the electric power for driving the electronic circuits even when the electric power from the power generation mechanism is used.

A power source control circuit according to an aspect of the invention includes: a power storage that stores electric power and can supplies the stored electric power to an electronic circuit; a generated power supply portion that can supply the electric power generated by a power generation mechanism to the power storage; a source power supply portion that supplies the electric power supplied from the power source circuit to the power storage; and a monitoring circuit that causes the generated power supply portion to stop the supply of the electric power to the power storage if the electric power supplied from the power source circuit is supplied to the power storage.

In the aspect of the invention, if both the power supply by the power source circuit and the power supply by the generated power supply portion can be performed, since the generated power supply portion stops the supply of the electric power to the power storage, the electric power supplied from the power source circuit is stored in the power storage. The electric power supplied from the power source circuit is more stable compared to the electric power output from the power generation mechanism, which fluctuates according to various conditions of power generation. According to the aspect of the invention, since the electric power supplied from the power source circuit is preferentially used, the electric power can be stably stored in the power storage. Furthermore, since the power storage can supply the stored electric power to the electronic circuit, even if the electric power from the power generation mechanism is used, it is possible to easily secure the electric power for driving the electronic circuit.

In the aspect described above, it is preferable that the power source control circuit further includes a switch electrically connected between the power storage and the electronic circuit, and that the monitoring circuit turns ON the switch if a voltage of the power storage is equal to or higher than a predetermined voltage which is higher than a voltage at which the electronic circuit operates.

In general, when the power storage supplies the electric power to the electronic circuit, the voltage of the power storage may instantaneously drop according to a load fluctuation of the electronic circuit. Therefore, if the voltage of the power storage is only the lowest voltage at which the electronic circuit can operate, when the power storage supplies the electric power to the electronic circuit, the voltage of the power storage instantaneously drops below the lowest voltage described above, and thus, the operation of the electronic circuit may become unstable. According to the aspect with the configuration described above, if the voltage of the power storage is equal to or higher than the predetermined voltage which is higher than the voltage at which the electronic circuit can operate, the switch is turned ON. Therefore, it is possible to have a margin, and even if the voltage of the power storage instantaneously drops, it is possible to suppress the voltage of the power storage from dropping below the lowest voltage that can operate the electronic circuit. Therefore, it becomes possible to operate the electronic circuit stably.

In the aspect described above, it is preferable that the power source control circuit further includes: an output node that is electrically connected to the electronic circuit; a first diode of which an anode is electrically connected to the power source circuit and a cathode is electrically connected to the output node; and a second diode of which an anode is electrically connected to the switch and a cathode is electrically connected to the output node. It is preferable that the voltage supplied from the power source circuit is higher than the voltage of the power storage.

According to the aspect with this configuration, it is possible to prevent back-flow of the current. Specifically, since the cathode of the first diode and the cathode of the second diode are connected to the output node, the current flows into the output node from the cathode of any one of the first diode or second diode having the higher voltage. Since the voltage of the power storage is lower than the voltage supplied from the power source circuit, the first diode is turned ON and the second diode is turned OFF. In this way, it is possible to prevent the current from flowing into the switch from the output node. In addition, if the electric power is not supplied from the power source circuit, since the voltage of the power source circuit is lower than the voltage of the power storage, the first diode is turned OFF and the second diode is turned ON. In this way, it is possible to prevent the current from flowing into the power source circuit from the output node.

In the aspect described above, it is preferable that the source power supply portion is provided between the power source circuit and the power storage, supplies the electric power output from the power source circuit to the power storage, and adjusts the current supplied to the power storage according to the voltage of the power storage. It is preferable that the source power supply portion adjusts the current supplied to the power storage according to the voltage of the power storage, and that the highest voltage output from the source power supply portion is higher than the highest voltage supplied from the generated power supply portion and a maximum charging voltage of the power storage is equal to or higher than the highest voltage output from the source power supply portion.

According to the aspect with this configuration, it is possible to suppress the overcharge of the power storage, and to suppress the deterioration of the power storage. In general, the voltage of the power storage is low in a fully discharged state, and increases as the charging current flows in the power storage. In addition, if the power storage is charged exceeding the maximum charging voltage, overcharging occurs and the power storage deteriorates.

Since the source power supply portion adjusts the current supplied to the power storage according to the voltage of the power storage, even if the electric power is supplied near the maximum charging voltage of the power storage, the overcharge is unlikely to occur. On the other hand, for example, if the power generation mechanism is a solar cell, the generated power supply portion causes a current having a current amount corresponding to the intensity of the light incident on the solar cell to flow into the power storage. Therefore, if strong light is incident on the solar cell near the maximum charging voltage of the power storage, a large amount of current flows into the power storage, and the voltage of the power storage exceeds the maximum charging voltage, which results in overcharging.

Therefore, near the maximum charging voltage of the power storage, since the electric power is stored in the power storage by the current from the source power supply portion by making the highest voltage supplied from the source power supply portion which can control the output current be higher than the highest voltage supplied from the generated power supply portion that cannot control the output current and be lower than the maximum charging voltage of the power storage, it is possible to suppress the overcharge of the power storage and to suppress the deterioration of the power storage.

In the aspect described above, it is preferable that the power generation mechanism generates electric power based on the energy of light.

According to the aspect with this configuration, the power source control circuit can operate the electronic circuit by the electric power generated by the power generation mechanism based on the energy of the light even if the electric power is not supplied from the power source circuit.

A power source control circuit according to an aspect of the invention includes: a secondary battery that is electrically connected to an electronic circuit; a first power supply circuit that is electrically connected to a solar cell and the secondary battery and supplies electric power generated by the solar cell to the secondary battery; a second power supply circuit that is electrically connected to a charging terminal connected to an external power source and the secondary battery, and supplies the electric power from the external power source to the secondary battery; and a monitoring circuit that stops the supply of the electric power from the first power supply circuit to the secondary battery if the external power source is connected to the charging terminal.

In the aspect of the invention, if both the power supply by the external power source and the power supply by the first power supply circuit can be performed, since the first power supply circuit stops the supply of the electric power to the secondary battery, the electric power supplied from the external power source is stored in the secondary battery. The electric power supplied from the external power source is more stable compared to the electric power output from the solar cell, which fluctuates according to various conditions of power generation. According to the aspect of the invention, since the electric power supplied from the external power source is preferentially used, the electric power can be stably stored in the secondary battery. Furthermore, since the secondary battery can supply the stored electric power to the electronic circuit, even if the electric power from the solar cell is used, it is possible to easily secure the electric power for driving the electronic circuit.

A portable information processing device according to an aspect of the invention includes the power source control circuit, the power generation mechanism, and the electronic circuit.

According to the aspect, it is possible to provide the portable information processing device which makes it easy to secure the electric power for driving the electronic circuit.

A power source control method according to an aspect of the invention is a power source control method of a power source control circuit that includes a power storage that stores electric power and can supply the stored electric power to an electronic circuit, a generated power supply portion that can supply the electric power generated by a power generation mechanism to the power storage, and a source power supply portion that supplies the electric power supplied from the power source circuit to the power storage. In the method, the generated power supply portion stops the supply of the electric power to the power storage if the electric power supplied from the power source circuit is supplied to the power storage.

In the aspect of the invention, if both the power supply by the power source circuit and the power supply by the generated power supply portion can be performed, since the generated power supply portion stops the supply of the electric power to the power storage, the electric power supplied from the power source circuit is stored in the power storage. The electric power supplied from the power source circuit is more stable compared to the electric power output from the power generation mechanism, which fluctuates according to various conditions of power generation. According to the aspect of the invention, since the electric power supplied from the power source circuit is preferentially used, the electric power can be stably stored in the power storage. Furthermore, since the power storage can supply the stored electric power to the electronic circuit, even if the electric power from the power generation mechanism is used, it is possible to easily secure the electric power for driving the electronic circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. However, in each drawing, the dimensions and scales of each part may be appropriately different from the actual ones. In addition, since the embodiments described below are preferred specific examples of the invention, various technically preferable limitations are given. However, the scope of the invention is not limited to these forms unless there is a statement to particularly limit the invention in the following description.

A. Embodiment

Hereinafter, a portable information processing device 100 according to the present embodiment will be described.

Figure 1:
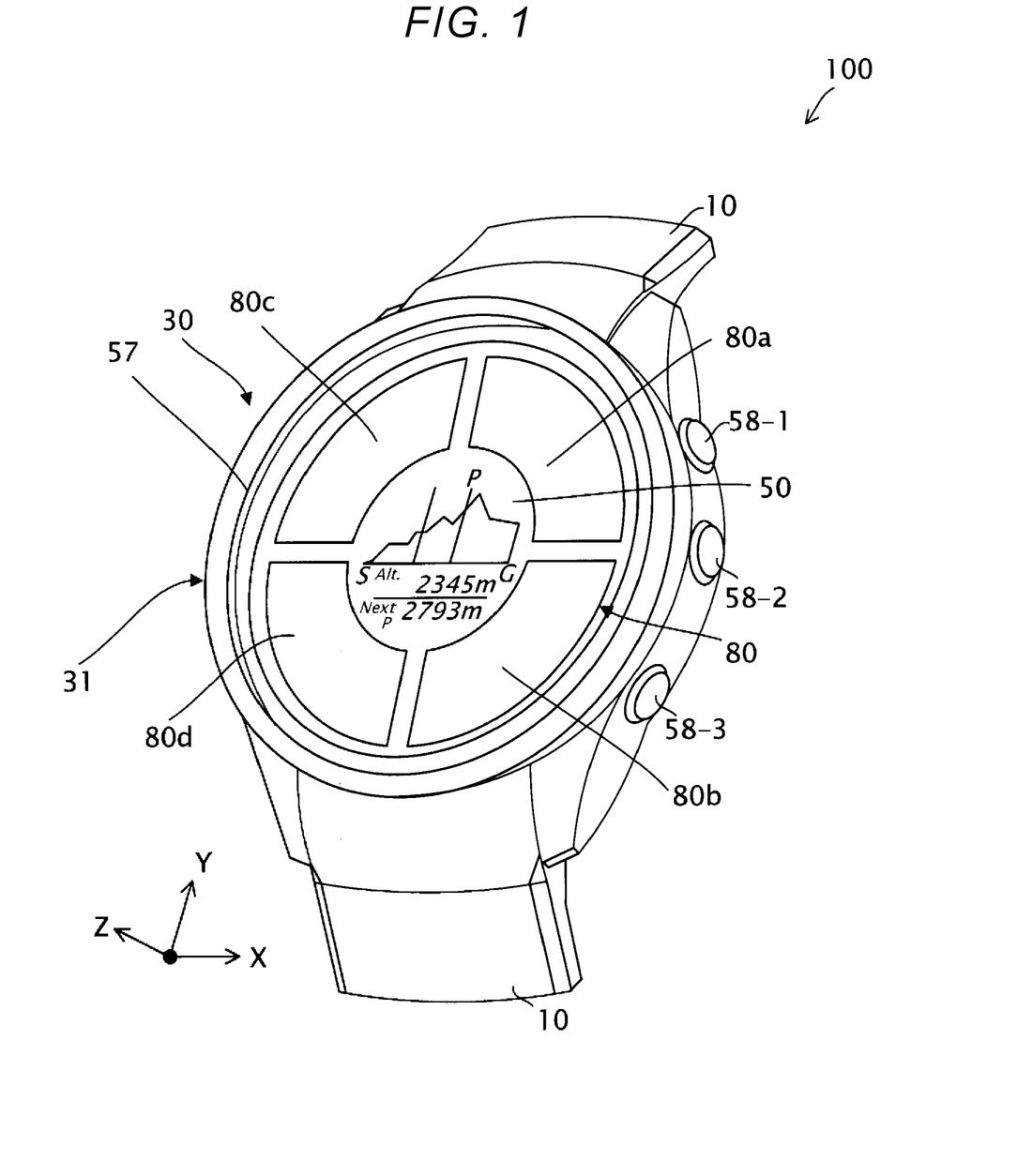
FIG. 1 is an external perspective view from the front side illustrating a schematic configuration of a portable information processing device.

A schematic external perspective view of a portable information processing device 100 from the front side is illustrated in FIG. 1. The portable information processing device 100 is a device mounted on a user's body. For example, a device mounted on the user's body includes a wrist device that is mounted on the user's wrist. The portable information processing device 100 illustrated in FIG. 1 includes a band portion 10 and a device main body 30. The device main body 30 includes a case portion 31, a display portion 50, a bezel 57, buttons 58-1 to 58-3, and a solar cell 80. The solar cell 80 includes a light receiving surface 80a, a light receiving surface 80b, a light receiving surface 80c, and a light receiving surface 80d. Here, the light receiving surface 80a, the light receiving surface 80b, the light receiving surface 80c, and the light receiving surface 80d are surfaces on the solar cell 80 on which light is incident.

For example, the portable information processing device 100 is a wrist device. In addition, as illustrated in FIG. 1, the portable information processing device 100 has an appearance similar to that of a wristwatch. In the drawing, if a display surface side of the display portion 50 is defined as a front surface, a direction from a rear surface to the front surface is defined as a Z axis positive direction. Two axes orthogonal to the Z axis are defined as X and Y axes, and the direction from the center of the display surface of the display portion 50 to the button 58-2 is defined as an X axis positive direction. Alternatively, a normal direction of the display surface of the display portion 50 can be defined as the Z axis, a direction from the center of the display surface of the display portion 50 to the band portion 10 can be defined as the Y axis, and an axis orthogonal to the Z axis and the Y axis can be defined as the X axis.

Alternatively, a direction away from the case portion 31 in the normal direction of the light receiving surface 80a, the light receiving surface 80b, the light receiving surface 80c, and the light receiving surface 80d may be defined as the Z axis positive direction. In a state in which the portable information processing device 100 is mounted on the user, the Z axis positive direction corresponds to the direction from the user to the case portion 31.

The band portion 10 is attached to the device main body 30 and is a member for mounting the device main body 30 on the user. The case portion 31 is a housing of a portable information processing device 100 having an opening portion at the front side. The case portion 31 can be formed with a metal such as stainless steel, or resin and the like.

The display portion 50 is engaged with the opening portion of the case portion 31, and displays an image. For example, a reflective liquid crystal panel or a display device based on electrophoretic deposition (EPD) can be adopted for the display portion 50. The bezel 57 is a component that protects and reinforces the display portion 50 and the case portion 31. The bezel 57 is disposed so as to surround the outer edge of the display portion 50 in a circular shape.

The button 58 is pressed by the user to notify the portable information processing device 100 of certain instruction. For example, if the button 58 is pressed, the portable information processing device 100 changes the image displayed on the display portion 50. The solar cell 80 generates the electric power based on the energy of light such as sun light.

Figure 2:
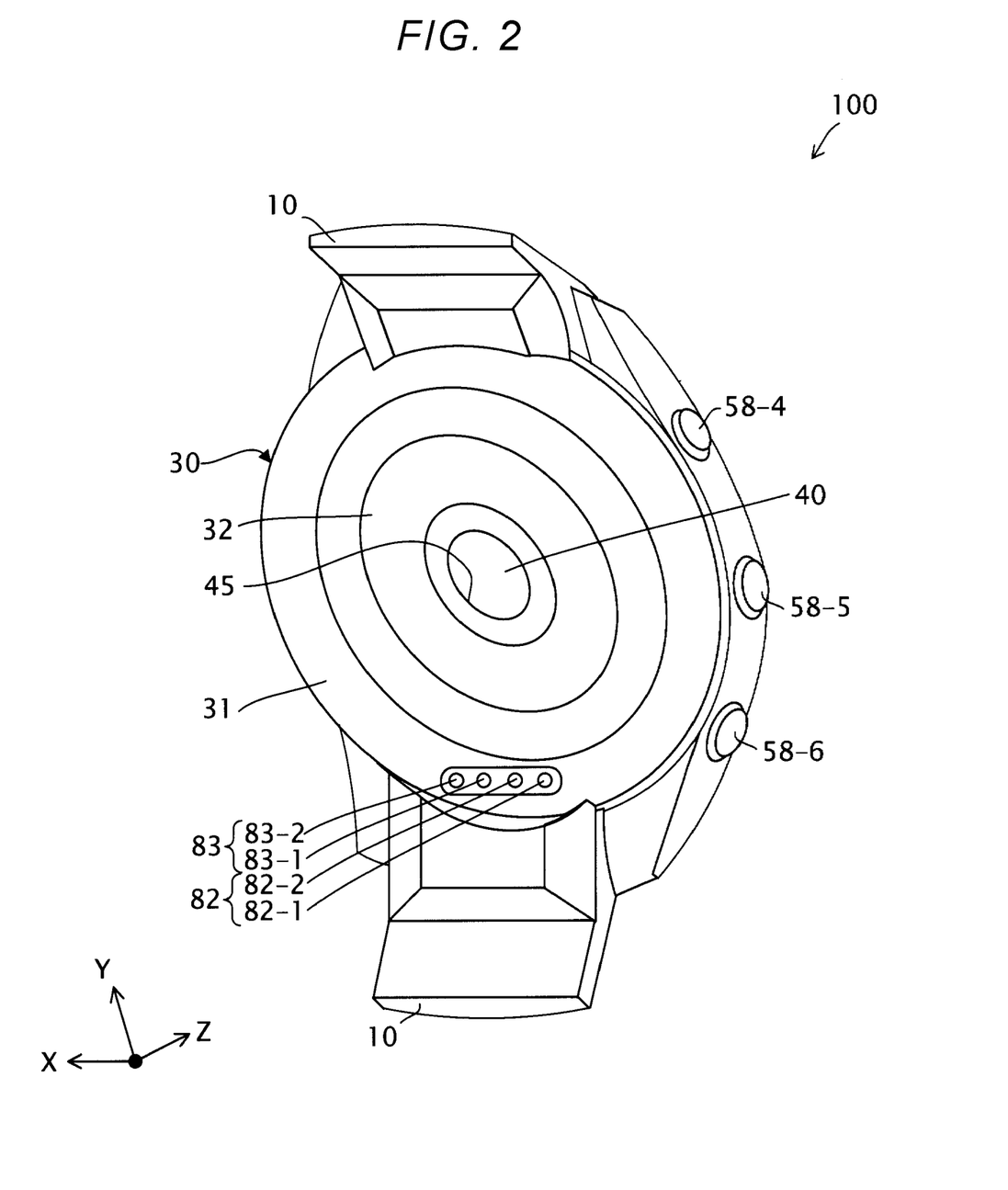
FIG. 2 is an external perspective view from the rear side illustrating a schematic configuration of the portable information processing device.

The external perspective view from the rear side illustrating a schematic configuration of a portable information processing device 100 is illustrated in FIG. 2. The device main body 30 of the portable information processing device 100 illustrated in FIG. 2 includes a light sensor portion 40, buttons 58-4 to 58-6, communication terminals 82 and charging terminals 83 in addition to the members illustrated in FIG. 1. The case portion 31 includes a projection portion 32 and a measurement window portion 45 positioned at the top of the projection portion 32.

The light sensor portion 40 detects a pulse wave or the like using the light. Specifically, the light sensor portion 40 includes a light emitting portion 42 (refer to FIG. 3), a light receiving portion 41 (refer to FIG. 3), a band pass filter, and an AD converter. The light emitted from the light emitting portion 42 is reflected from the tissue of a human body such as a blood vessel and is incident on the light receiving portion 41. The light receiving portion 41 generates a photo-electrically converted signal, that is, a pulse signal. The AD converter AD-converts the signal output from the light receiving portion 41 to generate pulse signal data, and outputs the generated pulse signal data to a central processing unit (CPU) 21 (refer to FIG. 3). Since an amount of light absorbed by the light emitting portion 42 due to hemoglobin or the like contained in the blood flowing through the blood vessel of a living body changes in conjunction with heartbeat, the amount of light incident on the light receiving portion 41 corresponds to a propagation of the heartbeat, that is, the pulse. The CPU 21 calculates a pulse rate, a pulse interval (R-R interval), a heart rate variability (HRV) and the like of the user based on the pulse signal data. Based on the same principle, the light sensor portion 40 can measure at least one of blood pressure and blood oxygen concentration by appropriately selecting the wavelength of the light emitted from the light emitting portion 42. The measurement window portion 45 is a hole for transmitting the light emitted from the light emitting portion 42 to the outside and for taking the light reflected from the tissue of the human body inside.

The communication terminal 82 is a terminal that comes in contact with the cradle 400 (refer to FIG. 5) which is an external device when the portable information processing device 100 communicates with another device and performs communication. The communication terminal 82 is configured with a communication terminal 82-1 and a communication terminal 82-2. The charging terminal 83 is a terminal that comes in contact with the cradle 400 and receives the electric power when the portable information processing device 100 is charged. The charging terminal 83 is configured with a charging terminal 83-1 and a charging terminal 83-2.

Figure 3:
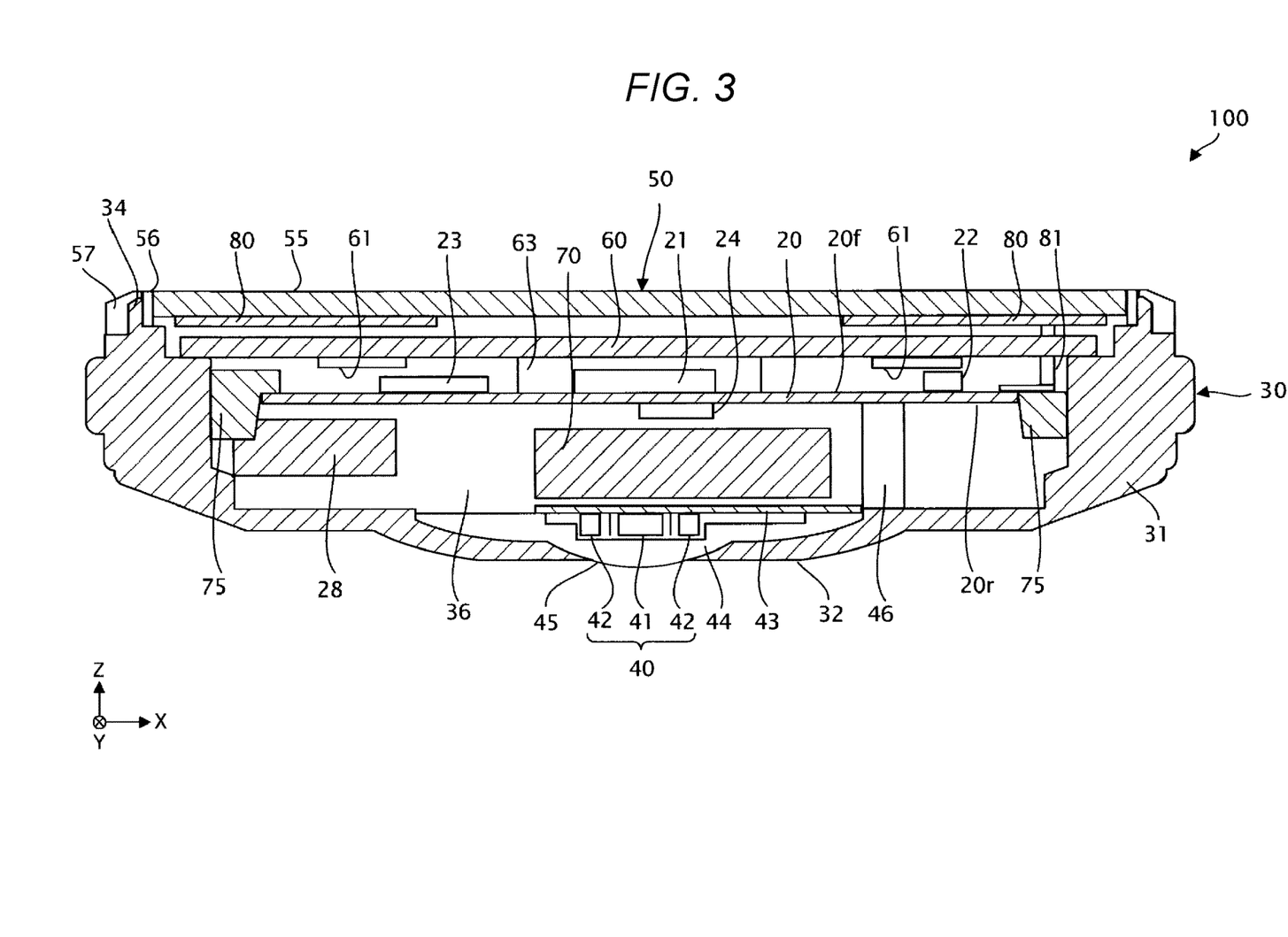
FIG. 3 is a cross-sectional view illustrating a configuration of the portable information processing device.

A cross sectional view illustrating the configuration of the portable information processing device 100 is illustrated in FIG. 3. The cross-sectional view illustrated in FIG. 3 indicates a cross section when the portable information processing device 100 is broken in the XZ plane so as to pass through the center of the display surface of the display portion 50. The device main body 30 of the portable information processing device 100 illustrated in FIG. 3 includes a circuit board 20, a CPU 21, an orientation sensor 22, an acceleration sensor 23, and a global positioning system (GPS) module 28 in addition to the members and devices illustrated in FIGS. 1 and 2. Furthermore, the device main body 30 includes a sensor substrate 43, a transparent cover 44, a connection wiring portion 46, a windshield 55, a joining member 56, a connection wiring portion 63, a secondary battery 70 (a power storage), a circuit case portion 75 and a connection wiring portion 81. In addition, the case portion 31 includes a protrusion portion 34 provided to protrude in the Z axis positive direction at the outer edge of the opening of the case portion 31. In addition, the light sensor portion 40 includes the light receiving portion 41 and the light emitting portion 42. In addition, the display portion 50 includes a display panel 60 and an illumination portion 61. An internal space 36 as a closed space is provided inside the case portion 31 which is surrounded by the case portion 31 and the windshield 55 which closes the opening of the case portion 31.

The circuit board 20 includes a front surface 20*f* and a back surface 20*r* which is a surface different from the front surface 20*f* and is a surface opposite to the front surface 20*f*. The end portion of the circuit board 20 is attached to the inside of the case portion 31 by a circuit case portion 75. The orientation sensor 22, the acceleration sensor 23, the CPU 21 and the like are mounted on the front surface 20*f* of the circuit board 20, and other circuit elements 24 and the like are mounted on the back surface 20*r*.

The CPU 21 is a circuit that controls the GPS module 28, a circuit that drives the light sensor portion 40 to measure the pulse wave, a circuit that drives the display portion 50, and a circuit that drives the orientation sensor 22 and the acceleration sensor 23 to detect the body motion information, and the like.

The orientation sensor 22 measures magnetism around the portable information processing device 100 and specifies the orientation based on the measured magnetism. The acceleration sensor 23 measures the acceleration in three axial directions of the portable information processing device 100. The GPS module 28 specifies a position of the portable information processing device 100 using a satellite signal from a GPS satellite which is one of the positioning information satellites.

As described in FIG. 2, the light emitting portion 42 emits light to the tissues of the human body. The light receiving portion 41 receives the light which was emitted to and reflected from the tissue of the human body. As illustrated in FIG. 3, the portable information processing device 100 includes two light emitting portions 42. Two light emitting portions 42 are disposed outside the light receiving portion 41. As described above, by disposing the light receiving portion 41 inside the light emitting portion 42, it is possible to prevent the external light entering from the outer peripheral side of the case portion 31 from penetrating into the light receiving portion 41, and thus, it is possible to reduce the influence of the external light on the light sensor portion 40.

The light receiving portion 41 and the light emitting portion 42 are disposed on the sensor substrate 43. The transparent cover 44 is a transparent member that transmits the light emitted from the light emitting portion 42 to the outside, and prevents the inflow of foreign substances into the case portion 31. For example, the transparent cover 44 is formed of photo-curing resin. As illustrated in FIG. 3, the transparent cover 44 protrudes from the top of the projection portion 32 of the case portion 31.

The connection wiring portion 46 electrically connects the sensor substrate 43 and the circuit board 20. The connection wiring portion 46 is electrically connected to the circuit board 20 at the back surface 20*r* of the circuit board 20. The windshield 55 has functions of preventing the inflow of foreign substances from the outside into the portable information processing device 100 and alleviating an impact applied to the portable information processing device 100 from the outside. Glass, acrylic resin, polycarbonate, or the like can be used as the material for the windshield 55. The windshield 55 is disposed so as to close the opening of the case portion 31 and is attached to the inner edge side of the protrusion portion 34 of the case portion 31.

The joining member 56 is a packing, an adhesive, or the like used for providing air tightness and liquid tightness. The illumination portion 61 functions as a backlight of the display panel 60. The illumination portion 61 is connected to the front surface 20*f* of the circuit board 20. By connecting the illumination portion 61 to the circuit board 20 in this way, it is possible to minimize wiring routing for the connection, and the light emitted from the illumination portion 61 is blocked by the circuit board 20 and thus, it is possible to reduce the influence of stray light to the light sensor portion 40.

The connection wiring portion 63 electrically connects the display panel 60 and the circuit board 20. In addition, the connection wiring portion 81 electrically connects the solar cell 80 and the circuit board 20. The connection wiring portion 46 and the connection wiring portion 81 are electrically connected to the circuit board 20 at the front surface 20*f* of the circuit board 20. On the other hand, as described above, the light sensor portion 40 is electrically connected to the back surface 20*r* of the circuit board 20, which is a surface opposite to the front surface 20*f*, via a connection wiring portion 46 configured with a flexible substrate or the like. By disposing in this way, the routing of wiring for connection can be minimized, the stray light which is the incident light for power generation but becomes leak light from the solar cell 80 side and penetrates into the case can be blocked by the circuit board 20, and thus, it is possible to reduce the influence of the external light to the light sensor portion 40. The circuit case portion 75 is a member supporting the circuit board 20.

The secondary battery 70 can supply the power to each device in the portable information processing device 100. This power is supplied to each circuit by being converted into a predetermined voltage, and drives a light sensor portion 40, and then, drives a circuit for detecting a pulse, a circuit for driving the display panel 60, a CPU 21 and the like. The storage of electric power in the secondary battery 70 is performed through a pair of charging terminals 83 conducted to the circuit board 20 by a conductive member (not illustrated) such as a power supply coil spring under the control of the power source control circuit 200, or is performed using the electric power generated by the solar cell 80. For example, a lithium ion battery, a lithium polymer battery or the like is adopted as the secondary battery 70. In the present embodiment, it is assumed that the system 250 (refer to FIG. 4) including the CPU 21, the orientation sensor 22, the acceleration sensor 23, the light sensor portion 40, the display panel 60, and the like can be driven at equal to or higher than 2.8 V. In addition, it is assumed that the maximum charging voltage of the secondary battery 70 is 4.2 V.

Figure 4:
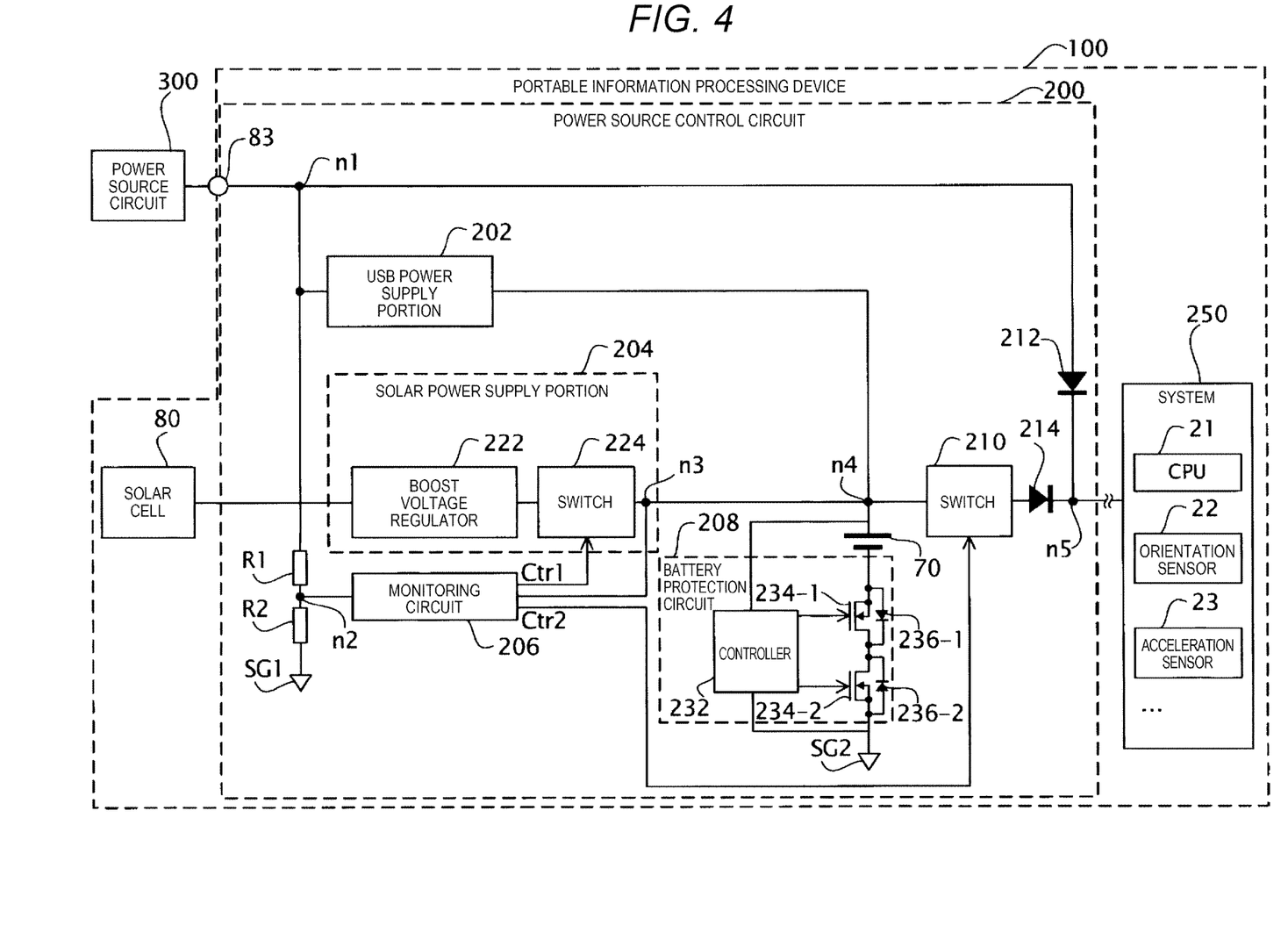
FIG. 4 is a diagram illustrating a configuration of a power source control circuit.

A configuration of a power source control circuit 200 is illustrated in FIG. 4. The power source control method by the power source control circuit 200 will be described with reference to FIG. 4. The portable information processing device 100 includes a solar cell 80, a power source control circuit 200, and a system 250 (electronic circuit). The power source control circuit 200 includes a charging terminal 83, a universal serial bus (USB) power supply portion 202 (a source power supply portion), a solar power supply portion 204 (a generated power supplier), a monitoring circuit 206, a battery protection circuit 208, a secondary battery 70, a switch 210, a back-flow prevention diode 212, a back-flow prevention diode 214, a resistor R1, and a resistor R2. The solar power supply portion 204 includes a voltage boost regulator 222 and a switch 224. The power source control circuit 200 is connected to a power source circuit 300 (an external power source) via the charging terminal 83. The power source circuit 300 is a circuit outside the portable information processing device 100, and outputs a stabilized voltage of 5 V according to the USB standard.

The electrical connection relation in the power source control circuit 200 will be described. The charging terminal 83 is electrically connected to a signal ground SG1 via an input node n1, the resistor R1, a relay node n2, and the resistor R2. In addition, the charging terminal 83 is electrically connected to the system 250 via the input node n1, the back-flow prevention diode 212 and an output node n5.

The USB power supply portion 202 is electrically connected to the charging terminal 83 via the input node n1. In addition, the USB power supply portion 202 is electrically connected to the positive electrode of the secondary battery 70 and the switch 210 via a relay node n4. In other words, the USB power supply portion 202 is a power supply circuit (a second power supply circuit) for the external power source which is electrically connected to the charging terminal 83 and the secondary battery 70.

The solar power supply portion 204 is electrically connected to the solar cell 80. In the solar power supply portion 204, the voltage boost regulator 222 is electrically connected to the solar cell 80, and further electrically connected to the switch 224. In other words, the solar power supply portion 204 is a power supply circuit (a first power supply circuit) for the power generation mechanism, which is electrically connected to the solar cell 80 and includes the voltage boost regulator 222 and the switch 224. The switch 224 is electrically connected to a positive electrode of the secondary battery 70 and the switch 210 via a relay node n3 and the relay node n4.

The monitoring circuit 206 is electrically connected to the power source circuit 300 via the relay node n2, the resistor R1, and the input node n1. In addition, the monitoring circuit 206 outputs a control signal Ctr1 to the switch 224. Similarly, the monitoring circuit 206 outputs a control signal Ctr2 to the switch 210. In addition, the monitoring circuit 206 is electrically connected to the positive electrode of the secondary battery 70 and the switch 210 via the relay node n3 and the relay node n4.

The battery protection circuit 208 is electrically connected to the secondary battery 70 in parallel. A negative electrode of the secondary battery 70 is electrically connected to a signal ground SG2.

The switch 210 is electrically connected to the system 250 via the back-flow prevention diode 212 and an output node n5.

An anode of the back-flow prevention diode 212 is electrically connected to the power source circuit 300 and a cathode thereof is electrically connected to the output node n5. An anode of the back-flow prevention diode 214 is electrically connected to the switch 210 and a cathode thereof is electrically connected to the output node n5.

The USB power supply portion 202 can supply the electric power supplied from the power source circuit 300 to the secondary battery 70 according to the USB standard. Specifically, the power source circuit 300 and the power source control circuit 200 are electrically connected to each other via the charging terminal 83, and if the electric power is supplied from the power source circuit 300 to the power source control circuit 200, the USB power supply portion 202 supplies the electric power to the secondary battery 70. The voltage supplied by the power source circuit 300 is 5 V according to the USB standard. The USB power supply portion 202 adjusts the current supplied to the secondary battery 70 according to the voltage of the secondary battery 70. Specifically, the USB power supply portion 202 supplies the electric power to the secondary battery 70 at a voltage between 3.1 V and 4.2 V.

The solar power supply portion 204 can supply the electric power generated by the solar cell 80 to the secondary battery 70. Since the voltage generated by the solar cell 80 is too low to charge the secondary battery 70, the voltage boost regulator 222 converts the generated voltage into a voltage that can charge the secondary battery 70. For example, the voltage boost regulator 222 converts the voltage according to the maximum power point tracking (MPPT). Then, the solar power supply portion 204 supplies the electric power to the secondary battery 70 at a voltage between 3.1 V and 4.0 V. In addition, if the electric power generated by the solar cell 80 is too small due to the small amount of incident light, and cannot be converted into the voltage that can charge the secondary battery 70, the solar power supply portion 204 does not perform the operation.

The battery protection circuit 208 is a circuit for suppressing an over discharge and over charge of the secondary battery 70. Specifically, the battery protection circuit 208 includes a controller 232, N-channel power metal oxide semiconductor field effect transistors (MOSFET) 234-1 (hereinafter, referred to simply as "FET") and FET 234-2. The FET 234-1 includes a parasitic diode 236-1 and the FET 234-2 includes a parasitic diode 236-2. The FET 234-1 is used for controlling the discharge. The FET 234-2 is used for controlling the charging. A gate of the FET 234-1 and a gate of the FET 234-2 are electrically connected to the controller 232. A source of the FET 234-1 is electrically connected to a negative electrode side of the secondary battery 70. A drain of the FET 234-1 is electrically connected to a drain of the FET 234-2. A source of the FET 234-2 is electrically connected to a positive electrode side of the secondary battery 70.

If the controller 232 detects a state of over discharge, specifically, if the voltage of the secondary battery 70 becomes equal to or lower than 2.8 V, the controller 232 turns off the FET 234-1 such that the discharge of the secondary battery 70 stops. However, the secondary battery 70 can be charged by the parasitic diode 236-1.

If the controller 232 detects a state of over charge, specifically, if the voltage of the secondary battery 70 becomes equal to or higher than 4.28 V, the controller 232 turns off the FET 234-2 such that the charge of the secondary battery 70 stops. However, the secondary battery 70 can be discharged by the parasitic diode 236-2.

When the electric power is supplied from the USB power supply portion 202 to the secondary battery 70, the monitoring circuit 206 causes the solar power supply portion 204 to stop supplying the electric power to the secondary battery 70. The monitoring circuit 206 determines whether or not the electric power is supplied from the USB power supply portion 202 to the secondary battery 70 in accordance with the voltage (the voltage of the relay node n2) supplied from the USB power supply portion 202. Specifically, if the charging terminal 83 is not electrically connected to the power source circuit 300, the voltage of the relay node n2 becomes 0 V because the relay node n2 is electrically connected to the signal ground SG 1 via the resistor R1 and the resistor R2. On the other hand, if the charging terminal 83 is electrically connected to the power source circuit 300, the voltage of the relay node n2 becomes higher than 0 V. The monitoring circuit 206 determines whether or not the power source circuit 300 is connected to the charging terminal 83 based on the voltage of the relay node n2.

Therefore, if the voltage of the relay node n2 is higher than 0 V, the electric power is supplied by the USB power supply portion 202. In this case, the monitoring circuit 206 transmits a signal indicating OFF as the control signal Ctr1. The switch 224 makes a state between the voltage boost regulator 222 and the relay node n3 be non-conductive upon receiving the signal indicating OFF. In this way, if the electric power is supplied from the power source circuit 300, the monitoring circuit 206 controls the solar power supply portion 204 so as not to supply the electric power to the secondary battery 70. On the other hand, if the voltage of the relay node n2 is 0 V, since the electric power is not supplied by the USB power supply portion 202, the monitoring circuit 206 transmits a signal indicating ON as the control signal Ctr1. The switch 224 makes the state between the voltage boost regulator 222 and the relay node n3 be conductive upon receiving the signal indicating ON. In this way, if the electric power is not supplied from the power source circuit 300, the monitoring circuit 206 controls the solar power supply portion 204 so as to supply the electric power to the secondary battery 70. The switch 224 and the switch 210 are, for example, transistors that perform a switching operation.

As described above, if any one of the power supply by the USB power supply portion 202 or the power supply by the generation of electricity of the solar cell 80 can be performed, the power source control circuit 200 charges the secondary battery 70 using the USB power supply portion 202 to which the electric power is supplied from the power source circuit 300 which is a stable power supply. Accordingly, since the stable power source circuit 300 is preferentially used for storage of the electric power in the secondary battery 70 compared to the unstable solar power supply portion 204 which is influenced by the weather or the like, it is easy to secure the electric power for operating the system 250. By preferentially using the USB power supply portion 202, it becomes possible to charge the secondary battery 70 in a shorter time compared to the case of using the power supply by the solar cell 80. The reason why the secondary battery 70 can be charged in a shorter time is generally the time that takes to charge the secondary battery 70 becomes shorter as the charging current becomes larger. In addition, the relationship between the current and the voltage input to and output from the voltage boost regulator 222 is input current×input voltage output current×output voltage. Therefore, a magnitude of the current output from the solar power supply portion 204 decreases as much as the voltage boosted by the voltage boost regulator 222. Therefore, in general, the current flowing from the USB power supply portion 202 to the secondary battery 70 is larger than the current flowing from the solar power supply portion 204 to the secondary battery 70. Therefore, by giving priority to the USB power supply portion 202, since the current larger than the current output from the solar power supply portion 204 flows to the secondary battery 70, the secondary battery 70 can be charged in a shorter time compared to the case of the power supply using the solar cell 80.

In addition, if the electric power is not supplied from the USB power supply portion 202, it is possible to store the electric power in the secondary battery 70 using the electric power of the solar cell 80. Accordingly, it is easy to secure the electric power to operate the system 250 under various circumstances.

In addition, if the voltage of the secondary battery 70 is a predetermined voltage, for example, equal to or higher than 2.8 V which is a voltage that can operate the system 250, for example, it is preferable that the monitoring circuit 206 turns ON the switch 210 (makes the secondary battery 70 and the system 250 be conductive). The predetermined voltage is, for example, 3.1 V. At this time, it is preferable that the voltage for turning OFF the switch 210 after turning ON (making the secondary battery 70 and the system 250 be non-conductive) is lower than a predetermined voltage, for example, 2.8 V. Specifically, if the voltage of the secondary battery 70 is equal to or higher than 3.1 V, the monitoring circuit 206 outputs a signal indicating ON as the control signal Ctr2 to the switch 210, and if the voltage of the secondary battery 70 becomes lower than 2.8 V, the monitoring circuit 206 outputs a signal indicating OFF as the control signal Ctr2 to the switch 210.

Here, if the electric power is supplied from the secondary battery 70 to the system 250, the voltage of the secondary battery 70 may instantaneously drop according to a load fluctuation of the system 250. Assuming that there is no switch 210, when the voltage of the secondary battery 70 becomes equal to or lower than 2.8 V, since the battery protection circuit 208 stops discharging the secondary battery 70, the system 250 cannot operate stably. On the other hand, if the switch 210 is provided as in the present embodiment, the switch is not turned ON unless the voltage reaches the predetermined voltage higher than the voltage that can operate the system 250. Therefore, even if the electric power is supplied from the secondary battery 70 to the system 250 and the voltage of the secondary battery 70 instantaneously drops, it is possible to suppress the voltage from dropping below the lowest voltage that can operate the system 250. Therefore, it becomes possible to operate the system 250 stably.

In addition, it is preferable that an output voltage of the power source circuit 300 is higher than the voltage of the secondary battery 70. Specifically, the voltage of the secondary battery 70 is between 2.8 V and 4.2 V while the output voltage of the power source circuit 300 is 5 V. According to such a relationship of the voltages, the back-flow prevention diode 212, and the back-flow prevention diode 214 make it possible to prevent back-flow of the current.

Specifically, since the cathode of the back-flow prevention diode 212 and the cathode of the back-flow prevention diode 214 are connected to the output node n5, the current flows into the output node n5 from the cathode of any one of the back-flow prevention diode 212 or the back-flow prevention diode 214 having the higher voltage. Since the voltage of the secondary battery 70 is lower than the output voltage of the power source circuit 300, the back-flow prevention diode 212 is turned ON and the back-flow prevention diode 214 is turned OFF. This makes it possible to prevent the current from flowing from output node n5 to the switch 210. In addition, if the electric power is not supplied from the power source circuit 300, since the voltage of the power source circuit 300 is lower than the voltage of the secondary battery 70, the back-flow prevention diode 212 is turned OFF and the back-flow prevention diode 214 is turned ON. This makes it possible to prevent the current from flowing from the output node n5 to the power source circuit 300.

In addition, as described above, the USB power supply portion 202 adjusts the current supplied to the secondary battery 70 according to the voltage of the secondary battery 70. It is preferable that the highest voltage supplied from the USB power supply portion 202 is higher than the highest voltage supplied from the solar power supply portion 204, and that a maximum charging voltage of the secondary battery 70 is equal to or higher than the highest voltage supplied from the USB power supply portion 202. Specifically, in the present embodiment, the highest voltage supplied from the solar power supply portion 204 is 4.0 V while the highest voltage supplied from the USB power supply portion 202 is 4.2 V, and the maximum charging voltage of the secondary battery 70 is 4.28 V. According to such a voltage relationship, overcharge of the secondary battery 70 can be suppressed, and deterioration of the secondary battery 70 can be suppressed. The reason why the overcharge of the secondary battery 70 can be suppressed by the current adjustment by the USB power supply portion 202 and the voltage relationship described above will be described.

The voltage of the secondary battery 70 is low in a completely discharged state, and increases as the charging current flows toward the secondary battery 70. In addition, if the voltage exceeds the maximum charging voltage and the secondary battery 70 is charged, the secondary battery 70 deteriorates due to the overcharge. The USB power supply portion 202 adjusts the current supplied to the secondary battery 70, and as the voltage of the secondary battery 70 increases, the current supplied to the secondary battery 70 decreases, and thus, the overcharge is suppressed. Therefore, even if the USB power supply portion 202 supplies the electric power near the maximum charging voltage of the secondary battery 70, it is difficult for the secondary battery 70 to be overcharged.

On the other hand, with regard to the solar power supply portion 204, an amount of the current supplied from the solar power supply portion 204 to the secondary battery 70 increases according to the light intensity. Therefore, when the voltage of the secondary battery 70 is close to 4.2 V, if intense light is incident on the secondary battery 70, a large amount of current flows through the secondary battery 70, which causes the overcharge. Therefore, as in the present embodiment, it is possible to suppress the overcharge of the secondary battery 70 according to the relationship in which the highest voltage supplied from the USB power supply portion 202 that can control the output current is set higher than the highest voltage supplied from the solar power supply portion 204 that cannot control the output current, and is set lower than the maximum charging voltage of the secondary battery 70. It is possible to suppress the deterioration of the secondary battery 70 by suppressing the overcharge of the secondary battery 70.

In addition, as illustrated in FIG. 4, by using the solar cell 80, it is possible to supply the electric power generated by the solar cell 80 to the secondary battery 70 if the power supply from the USB power supply portion 202 is not performed. As a result, the portable information processing device 100 can operate the system 250 by the electric power generated by the solar cell 80 even if the electric power is not supplied from the power source circuit 300.

In addition, as illustrated in FIG. 1, FIG. 3 and FIG. 4, the portable information processing device 100 includes a power source control circuit 200, a solar cell 80, and a system 250. In this way, it is possible to provide a portable information processing device 100 that can charge the secondary battery 70 with priority to the USB power supply portion 202 which is a stable power source.

In the present embodiment, the secondary battery 70 is an example of a "power storage", the USB power supply portion 202 is an example of a "source power supply portion", and the solar power supply portion 204 is an example of a "generated power supply portion". In addition, the solar cell 80 is an example of a "power generation mechanism", and the system 250 is an example of an "electronic circuit". In addition, the switch 210 is an example of a "switch electrically connected between the power storage and the electronic circuit". In addition, the back-flow prevention diode 212 is an example of a "first diode" and the back-flow prevention diode 214 is an example of a "second diode".

Figure 5:
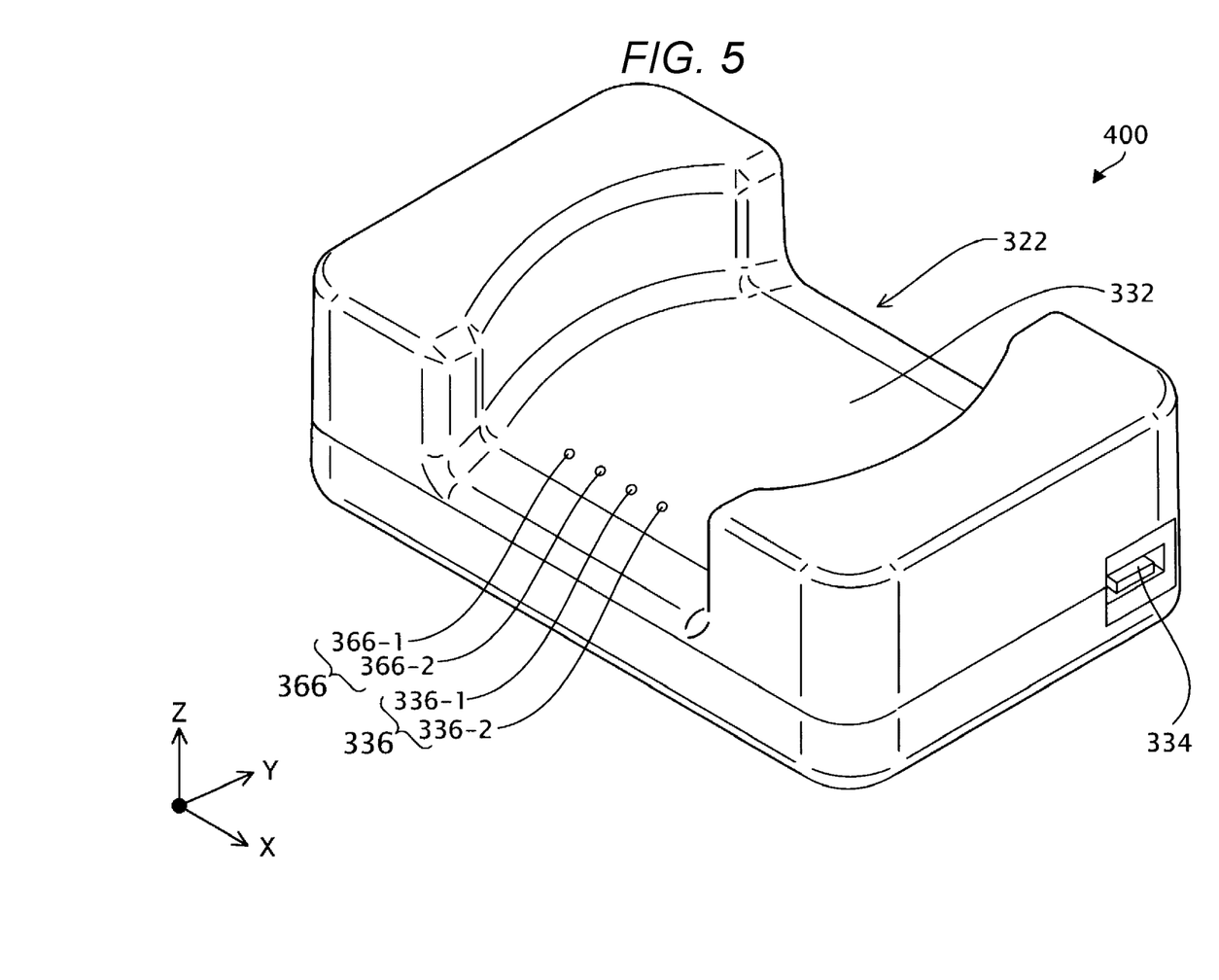
FIG. 5 is an external perspective view illustrating a schematic configuration of a cradle.

An external perspective view illustrating a schematic configuration of the cradle 400 is illustrated in FIG. 5. The cradle 400 is a device that performs charging and data transfer of the portable information processing device 100 without directly connecting the portable information processing device 100 to standard connectors such as USB standard. The cradle 400 has a shape in which a part of a rectangular parallelepiped is recessed. In the description below, X axis indicates the longitudinal direction of the rectangular parallelepiped, Y axis indicates the width direction, and Z axis indicates the height direction.

The cradle 400 includes a device housing recess 322, a USB connector 334, charging electrode pins 336, and communication electrode pins 366. The device housing recess 322 is a recess for housing the portable information processing device 100 in the cradle 400. In addition, the device housing recess 322 has a depth substantially the same as a thickness of the installed portable information processing device 100.

The USB connector 334 is a connector that connects the cradle 400 to the power source circuit 300 according to the USB standard. In the cradle 400, as a cable to be connected to an external device such as a personal computer (PC), a USB cable that can perform the high-speed data transfer is used, and thus, the high-speed data communication can be performed. The USB connector 334 is formed, for example, from standard 5 pins (D+, D−, Vbus, GND, and ID).

If a PC is connected to the USB connector 334, the "D+", "D−", "Vbus" and "GND" terminals of the USB connector 334 are used. In this way, the cradle 400 relays the communication signal between the portable information processing device 100 and the PC connected to the USB connector 334.

The "Vbus" terminal is a +5V voltage terminal supplied from the PC via an information signal cable (a USB cable). In this way, the cradle 400 can charge the secondary battery 70 of the portable information processing device 100 connected to the charging electrode pins 336 using the voltage supplied via the USB. According to this, it is possible to easily construct the charging function and the communication function of the cradle 400.

The charging electrode pins 336 receive the source power supplied from the power source circuit 300 via the USB connector 334. Therefore, when the charging electrode pins 336 and the charging terminal 83 are in contact with each other, the portable information processing device 100 can receive the source power supplied from the power source circuit 300. The charging electrode pins 336 are formed by a charging electrode pin 336-1 and a charging electrode pin 336-2.

The communication electrode pin 366 relays the communication with the external device that includes the power source circuit 300 via the USB connector 334. Therefore, when the communication electrode pins 366 and the communication terminal 82 are in contact with each other, the portable information processing device 100 can communicate with the external device described above. The communication electrode pins 366 are formed by a communication electrode pin 366-1 and a communication electrode pin 366-2. The communication electrode pins 366 input or output a USB signal conforming to the USB standard. According to this, the USB connection standard can be satisfied.

The material of the charging electrode pins 336 and the communication electrode pins 366 is not particularly limited as long as the material substantially has conductivity, and for example, a metal material such as copper or aluminum, or an alloy containing the metal material can be used. In addition, water-repellent gold plating having a thickness of about 8 μm may be applied to the charging electrode pins 336 and the communication electrode pins 366. According to this, corrosion of the charging electrode pins 336 and the communication electrode pins 366 can be prevented.

Figure 6:
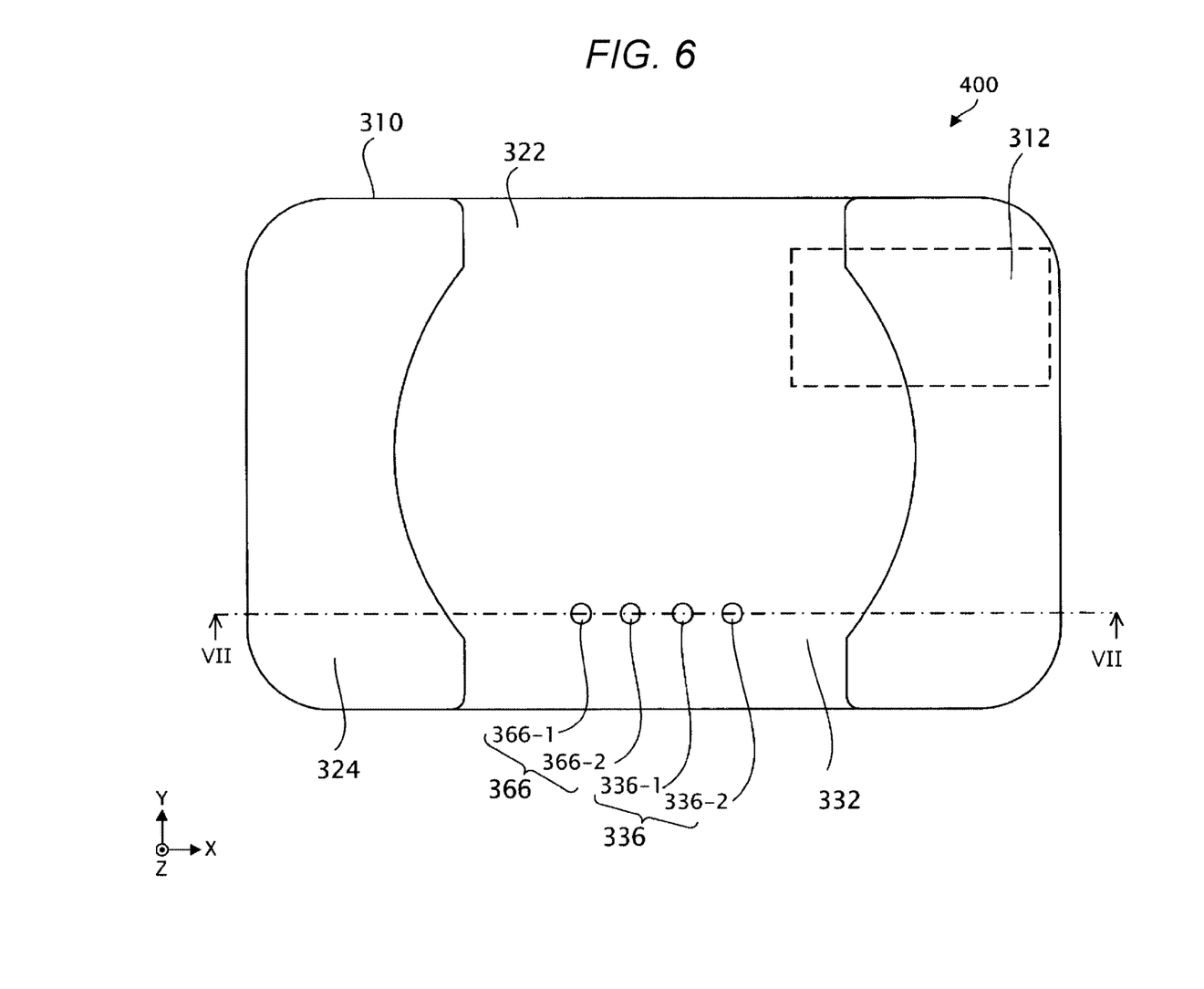
FIG. 6 is a plan view of the cradle.

A plan view of the cradle 400 is illustrated in FIG. 6. The plan view illustrated in FIG. 6 is a diagram of the cradle 400 in a plan view from the +Z direction. In addition to the members and devices illustrated in FIG. 5, the cradle 400 includes a cradle case 310 and a connector substrate 312. The cradle case 310 is configured with an exterior cover 324 and a base frame 326 (refer to FIG. 7) for closing the opening portion opened on the lower surface of the exterior cover 324.

The USB connector 334 and other required electronic components (not illustrated) are mounted on the connector substrate 312. The connector substrate 312 is fastened and fixed to the base frame 326 by a plurality of fixing screws (not illustrated).

The exterior cover 324 is formed from a rectangular block-shaped container body, and the device housing recess 322 is opened on the front surface thereof. The device housing recess 322 has a slightly larger shape than the external shape of the portable information processing device 100 so as to be detachably mounted, and is formed by recessing the front surface into the inner side to form a recessed portion. Side faces disposed on the left and right sides are provided on the front surface of the exterior cover 324 by providing the device housing recess 322, and a frame portion of the device housing recess 322 having the opposing two sides is configured by the above described side faces.

Figure 7:
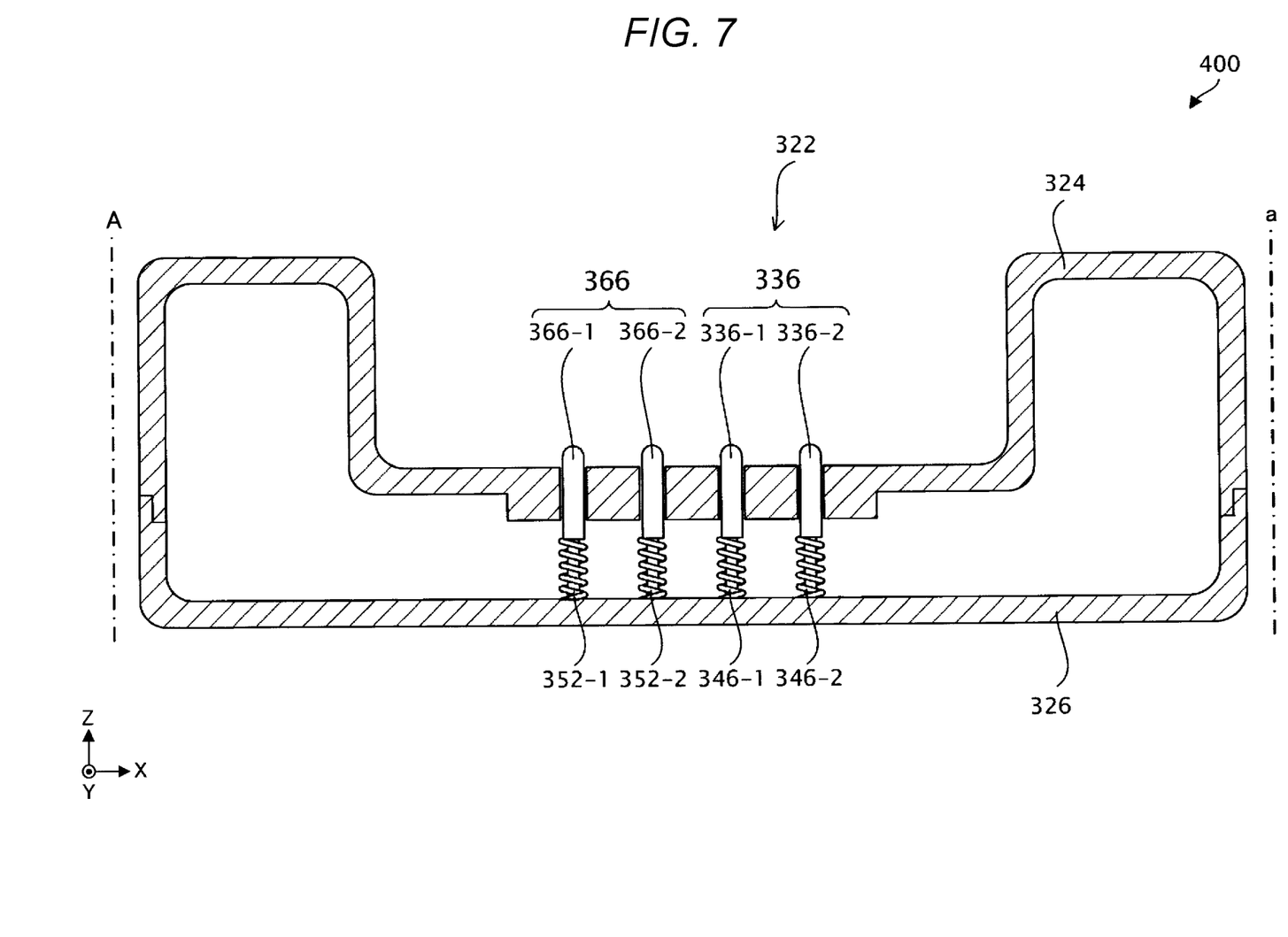
FIG. 7 is an example of a partial cross-sectional view of the cradle taken along the line VII-VII in FIG. 6.

FIG. 7 is an example of a partial cross-sectional view of the cradle 400 taken along the line VII-VII in FIG. 6. In addition to the members and devices illustrated in FIG. 5 and FIG. 6, the cradle 400 includes the base frame 326, a spring 346-1, a spring 346-2, a spring 352-1, and a spring 352-2.

As illustrated in FIG. 7, the charging electrode pin 336-1 is supported by the spring 346-1. Similarly, the charging electrode pin 336-2 is supported by spring 346-2, the communication electrode pin 366-1 is supported by the spring 352-1 and the communication electrode pin 366-2 is supported by the spring 352-2. When the portable information processing device 100 is mounted on the device housing recess 322, the charging electrode pin 336-1 presses the spring 346-1, and comes in contact with the charging terminal 83-1. Similarly, when the portable information processing device 100 is mounted on the device housing recess 322, the charging electrode pin 336-2 comes in contact with the charging terminal 83-2, the communication electrode pin 366-1 comes in contact with the communication terminal 82-1, and the communication electrode pin 366-2 comes in contact with the communication terminal 82-2.

B. Modification Example

Each of the above embodiments can be variously modified. Specific aspects of the modifications will be exemplified below. Two or more aspects selected from any of the following examples can be appropriately combined within a range not mutually contradictory. In the following modification examples, regarding elements whose actions and functions are the same as those in the embodiment, the reference numerals referred to in the above description will be used, and the detailed description thereof will be appropriately omitted.

B.1. First Modification Example

Figure 8:
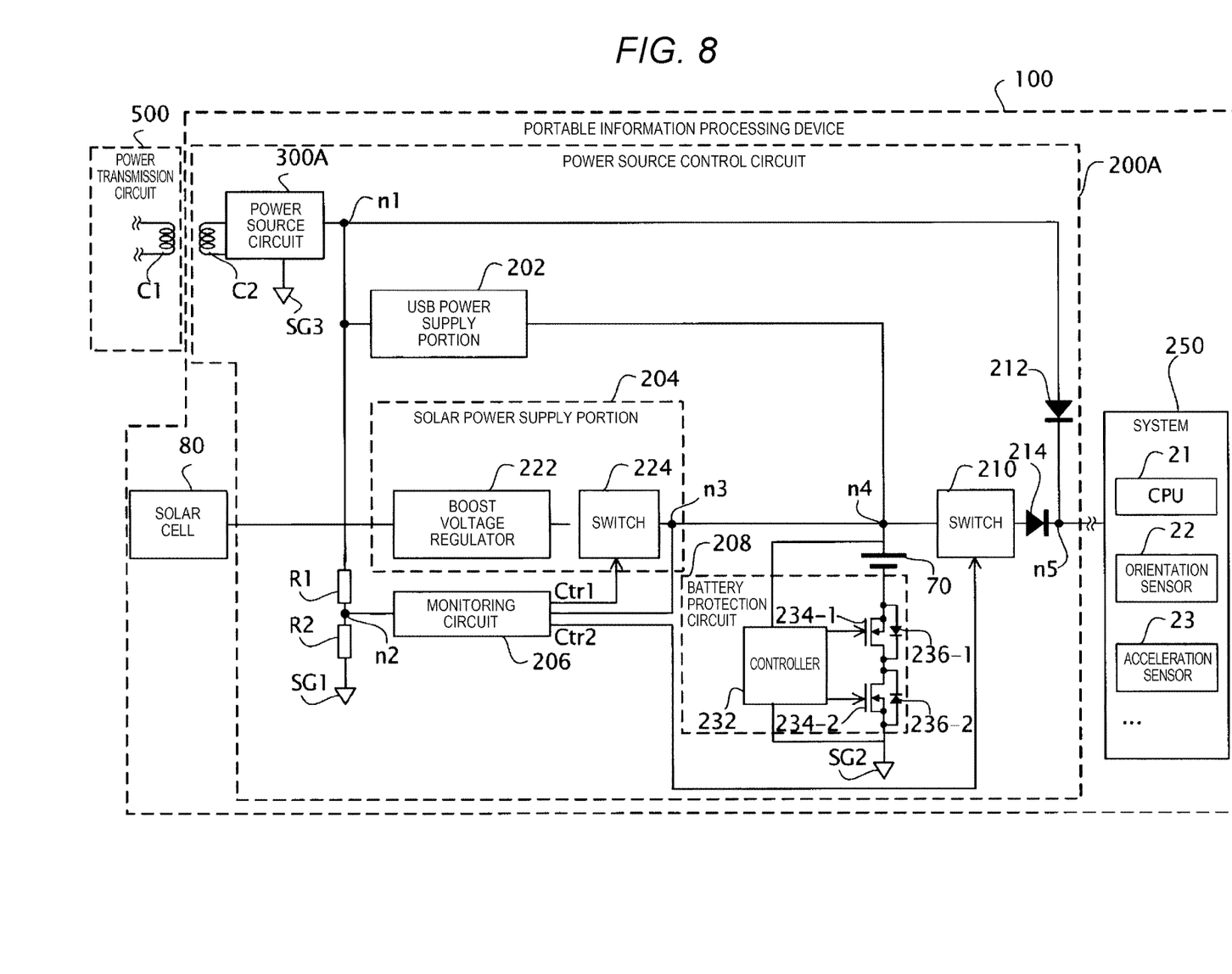
FIG. 8 is a diagram illustrating a configuration of a power source control circuit in a first modification example.

In the power source control circuit 200 in the present embodiment, the electric power is supplied by contact power supplying. On the other hand, in a power source control circuit 200A in a first modification example, the electric power is supplied by contactless power supply. For example, an electromagnetic induction method, a magnetic field resonance method, a microwave method, or a direct current resonance method can be adopted as the contactless power supplying. In any methods, since the obtained electric power is an alternating current, the power source control circuit 200A converts the obtained electric power into a direct current using a power source circuit.

A diagram illustrating a configuration of a power source control circuit 200A in the first modification example is illustrated in FIG. 8. The power source control circuit 200A illustrated in FIG. 8 is an example of a power source control circuit in which the electromagnetic induction method is adopted as the contactless power supplying.

The power source control circuit 200A includes a power source circuit 300A and a coil C2 in addition to the elements included in the power source control circuit 200, and does not include the charging terminal 83 included in the power source control circuit 200. The power source control circuit 200A has the same configuration and the connection relationships those of the power source control circuit 200 except that the power source circuit 300A and the coil C2 are included instead of the charging terminal 83. A power transmission circuit 500 illustrated in FIG. 8 includes a coil C1.

The power source circuit 300A is electrically connected to the coil C2. In addition, the power source circuit 300A is electrically connected to a signal ground SG 3. In addition, the power source circuit 300A is electrically connected to the input node n1.

The power transmission circuit 500 changes the magnetic flux passing through the coil C1 and the coil C2 by making the alternating current flow through the coil C1. An induced current is generated in the coil C2 due to the change of the magnetic flux. The power source circuit 300A converts the generated induced current into a direct current. The power source circuit 300A supplies the electric power to the USB power supply portion 202 via the input node n1. In addition, the power source circuit 300A supplies the electric power to the system 250 via the input node n1, the back-flow prevention diode 212, and the output node n5.

B.2. Other Modification Example

In the present embodiment, as illustrated in FIG. 1, the display portion 50 and a part of the solar cell 80 do not overlap in a plan view from the +Z axis direction, but the display portion 50 and a part of the solar cell 80 may be disposed so as to overlap each other. In addition, the number of light emitting portions 42 illustrated in FIG. 3 is two, but not limited to two, and may be one, or equal to or more than three. In addition, the configuration of the case portion 31 is not limited to a single unit, but may be divided into a plurality of portions, for example, a two-body structure in which a back cover is provided on the mounting side to the user. In addition, the transparent cover 44 may not protrude from the top of the projection portion 32 of the case portion 31.

In addition, in the present embodiment, the USB power supply portion 202 is used as an example of the source power supply portion. However, the electric power may be supplied to the source power supply portion according to a standard other than USB. An example of another standard includes IEEE (Institute of Electrical and Electronics Engineers) 1394 and the like.

In addition, in the present embodiment, the power generation is performed by the solar cell 80, but is not limited thereto. For example, the portable information processing device 100 may include at least one of the solar cell 80, a thermo-electric element (a power generation mechanism) that converts heat energy into electric power energy, and a vibration power generation element (a power generation mechanism) that converts pressure generated on a vibration surface due to the vibration into the electric power.

In the present embodiment, the GPS module 28 performs various processes using the satellite signals from the GPS satellites. However, as position information satellites other than the GPS satellites, satellite signals from positioning satellites in a Global Navigation Satellite System (GNSS), or positioning satellites in a system other than the GNSS, may be used. For example, the portable information processing device 100 may use satellite signals from one, or equal to or more than two satellite positioning systems among a wide area augmentation system (WAAS), an European geostationary-satellite navigation overlay service (EGNOS), a quasi zenith satellite system (QZSS), a global navigation satellite system (GLONASS), a GALILEO, Bei Dou Navigation Satellite System (BeiDou), or the like.

In addition, the portable information processing device 100 is described as a wrist device included in a device mounted on the user's body, but not limited thereto. For example, the portable information processing device 100 may be a head mounted display (HMD) mounted on the user's head.

In addition, in the embodiment and the modification example, the USB power supply portion 202 is used to store the electric power in the secondary battery 70 (refer to FIG. 4 and FIG. 8). However, the invention is not limited thereto, but the input node n1 and the relay node n4 may be directly connected to each other.

What is claimed is:

1. A power source control circuit comprising:
   a generated power supply portion that supplies electric power generated by a power generation mechanism to a secondary battery;
   a source power supply portion that supplies electric power supplied from a power source circuit to the secondary battery; and
   a monitoring circuit that stops the supply of the electric power from the generated power supply portion to the secondary battery if the electric power supplied from the power source circuit is supplied to the secondary battery,
   wherein the source power supply portion is provided between the power source circuit and the secondary battery, supplies the electric power output from the power source circuit to the secondary battery, and adjusts a current supplied to the secondary battery according to a voltage of the secondary battery, and
   wherein a highest voltage output from the source power supply portion is higher than a highest voltage supplied from the generated power supply portion and a maximum charging voltage of the secondary battery is equal to or higher than the highest voltage output from the source power supply portion.

2. The power source control circuit according to claim 1, further comprising:
   a switch provided between the secondary battery and the electronic circuit,
   wherein the monitoring circuit turns ON the switch if a voltage of the secondary battery is equal to or higher than a predetermined voltage which is higher than a voltage at which the electronic circuit operates.

3. The power source control circuit according to claim 2, further comprising:
   an output node that is electrically connected to the electronic circuit;
   a first diode of which an anode is electrically connected to the power source circuit and a cathode is electrically connected to the output node; and
   a second diode of which an anode is electrically connected to the switch and a cathode is electrically connected to the output node,
   wherein the voltage supplied from the power source circuit is higher than the voltage of the secondary battery.

4. A portable information processing device comprising:
   the power source control circuit according to claim 3;
   the power generation mechanism;
   the electronic circuit; and
   the secondary battery.

5. A portable information processing device comprising:
   the power source control circuit according to claim 2;
   the power generation mechanism;
   the electronic circuit; and
   the secondary battery.

6. The power source control circuit according to claim 1, the power generation mechanism is a photovoltaics.

7. A portable information processing device comprising:
the power source control circuit according to claim 6;
the power generation mechanism;
the electronic circuit; and
the secondary battery.

8. A portable information processing device comprising:
the power source control circuit according to claim 1;
the power generation mechanism;
the electronic circuit; and
the secondary battery.

9. A power source control circuit comprising:
a first power supply circuit that is electrically connected to a solar cell and a secondary battery and supplies electric power generated by the solar cell to the secondary battery;
a second power supply circuit that is electrically connected to a charging terminal connected to an external power source and the secondary battery, and supplies electric power from the external power source to the secondary battery; and
a monitoring circuit that stops the supply of the electric power from the first power supply circuit to the secondary battery if the external power source is connected to the charging terminal,
wherein the second power supply circuit is provided between the external power source and the secondary battery, supplies the electric power output from the external power source to the secondary battery, and adjusts a current supplied to the secondary battery according to a voltage of the secondary battery, and
wherein a highest voltage output from the second power supply circuit is higher than a highest voltage supplied from the first power supply circuit and a maximum charging voltage of the secondary battery is equal to or higher than the highest voltage output from the second power supply circuit.

10. A power source control method using a power source control circuit for driving an electric circuit that includes
a first power supply portion that supplies electric power generated by a power generation mechanism to a secondary battery, and
a second power supply portion that supplies electric power supplied from a power source circuit to the secondary battery, the method comprising:
stopping, by a monitoring circuit, the supply of the electric power from the first power supply portion to the secondary battery if the power source circuit supplies the electronic power to the secondary battery,
wherein the second power supply portion is provided between the power source circuit and the secondary battery, supplies the electric power output from the power source circuit to the secondary battery, and adjusts a current supplied to the secondary battery according to a voltage of the secondary battery, and
wherein a highest voltage output from the second source power supply portion is higher than a highest voltage supplied from the first power supply portion and a maximum charging voltage of the secondary battery is equal to or higher than the highest voltage output from the second power supply portion.

11. The power source control method according to claim 10, further comprising:
determining, by the monitoring circuit, a voltage of the secondary battery is equal to or higher than a voltage at which the electronic circuit operates; and
supplying the electric power from the first power supply portion to the secondary battery.

12. The power source control method according to claim 10, wherein
the power generation mechanism is a photovoltaics.

* * * * *